US008693344B1

(12) United States Patent
Adams et al.

(10) Patent No.: US 8,693,344 B1
(45) Date of Patent: Apr. 8, 2014

(54) SYSTEMS AND METHODS FOR GENERATING PACKET FORWARDING RULES BASED ON NETWORK POLICY

(75) Inventors: Robert Edward Adams, San Mateo, CA (US); Mandeep Singh Dhami, San Jose, CA (US); Robert W. Sherwood, Palo Alto, CA (US); Daniel E. Talayco, Sunnyvale, CA (US); Shudong Zhou, Fremont, CA (US)

(73) Assignee: Big Switch Network, Inc., Mountain View, CA (US)

( * ) Notice: Subject to any disclaimer, the term of this patent is extended or adjusted under 35 U.S.C. 154(b) by 185 days.

(21) Appl. No.: 13/246,611

(22) Filed: Sep. 27, 2011

(51) Int. Cl.
*H04L 12/26* (2006.01)
*H04L 12/28* (2006.01)

(52) U.S. Cl.
USPC .......................... 370/241; 370/351; 370/912

(58) Field of Classification Search
USPC ......... 370/229, 235, 236, 241, 252, 351, 389, 370/392, 912
See application file for complete search history.

(56) References Cited

U.S. PATENT DOCUMENTS

| 7,343,413 | B2 | 3/2008 | Gilde et al. | |
|---|---|---|---|---|
| 7,428,583 | B1 | 9/2008 | Lortz et al. | |
| 7,561,515 | B2 | 7/2009 | Ross | |
| 7,606,160 | B2 | 10/2009 | Klinker et al. | |
| 7,760,729 | B2 | 7/2010 | Srisuresh et al. | |
| 2011/0273988 | A1* | 11/2011 | Tourrilhes et al. | 370/237 |
| 2012/0044935 | A1* | 2/2012 | Hama et al. | 370/389 |

FOREIGN PATENT DOCUMENTS

WO WO 2011030490 A1 * 3/2011

OTHER PUBLICATIONS

McKeown et al., OpenFlow Switch Specification, Feb. 28, 2011, version 1.1.0, pp. 1-56.*
Pfaff et al., OpenFlow Switch Specification, Dec. 31, 2009, 42 pages.
McKeown et al., OpenFlow: Enabling Innovation in Campus Networks, Mar. 14, 2008, 6 pages.
Cisco Systems, Cisco Catalyst 6500 Architecture, 1992-2007, 28 pages.
Appenzeller, U.S. Appl. No. 12/971,924, filed Dec. 17, 2010.
Casado et al., "SANE: A Protection Architecture for Enterprise Networks," Usenix Security, Aug. 2006 (15 pages).
Casado et al., "Ethane: Taking Control of the Enterprise," Conference of Special Interest Group on Data Communication (SIGCOMM), Japan, Aug. 2007 (12 pages).
Koponen et al., "Onix: A Distributed Control Platform for Large-scale Production Networks," Usenix Security, Oct. 2010 (14 pages).
Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.

* cited by examiner

*Primary Examiner* — Omar Ghowrwal
(74) *Attorney, Agent, or Firm* — Treyz Law Group; Chih-Yun Wu; Michael H. Lyons

(57) ABSTRACT

Network policies that control the flow of traffic through a network may be implemented using a controller server that controls a network of switches. Based on network packet attributes, the controller server may identify network policies that are associated with the network traffic. The controller server may identify dependencies between the network policies based on priorities that are associated with the network policies and overlap between the network policies. The controller server may provide the switches with packet forwarding rules based on the identified dependencies between the network policies, network switch attributes, and network switch capabilities. The packet forwarding rules may implement network policies for current network traffic and future network traffic.

18 Claims, 23 Drawing Sheets

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

| | PHYSICAL IN PORT | IP SOURCE ADDRESS | IP DESTINATION ADDRESS | DESTINATION TCP PORT | SOURCE TCP PORT | ACTION |
|---|---|---|---|---|---|---|
| E1' → | 1 | 1.1.1.1 | 2.2.2.2 | 22 | 7777 | SEND TO PORT 2 |
| | ... | | | | | |
| C1' → | * | * | 2.2.2.2 | * | * | SEND TO PORT 4 |
| | ... | | | | | |
| E2' → | 5 | 1.1.1.1 | 2.2.2.2 | 22 | 7777 | SEND TO PORT 6 |

FIG. 11

| NETWORK POLICY | PRIORITY |
|---|---|
| BLOCK HOST EHA FROM TRANSMITTING TO HOST EHB | 100 |
| ALLOW HOST EHA TO TRANSMIT TO HOST EHB USING TCP | 101 |
| BLOCK HOST EHA FROM TRANSMITTING TO HOST EHB USING TCP ON TCP PORT 22 | 102 |
| ALLOW HOST EHA TO TRANSMIT TO IP ADDRESSES MATCHING 192.*.[2,3,4].* USING UDP | 103 |
| BLOCK HOST EHA FROM TRANSMITTING TO IP ADDRESSES MATCHING 192.*.*.* USING UDP ON UDP PORT 80 | 104 |

FIG. 12

| MATCHING RULE | | | | EXACT MATCH? | ACTION | PRIORITY |
|---|---|---|---|---|---|---|
| ... SOURCE ETHERNET ADDRESS | PROTOCOL | PROTOCOL PORT | DESTINATION IP ADDRESS ... | | | |
| ... A ... | * | * | IP_B ... | YES | DENY | 100 |
| ... A ... | TCP | * | IP_B ... | YES | ALLOW | 101 |
| ... A ... | TCP | 22 | IP_B ... | YES | DENY | 102 |
| ... A ... | UDP | * | 192.*.*.* ... | NO | CONTROLLER | 103 |
| ... A ... | UDP | 80 | 192.*.*.* ... | YES | DENY | 104 |
| ... A ... | UDP | * | 192.*.*.* ... | NO | CONTROLLER | 102 |

FIG. 16

| PHYSICAL IN PORT | PROTOCOL | PROTOCOL PORT | DESTINATION IP ADDRESS | ... | ACTION | PRIORITY |
|---|---|---|---|---|---|---|
| 1 | * | * | IP_B | | DROP | 100 |
| 1 | TCP | * | IP_B | | SEND TO PORT 2 | 101 |
| 1 | TCP | 22 | IP_B | | DROP | 102 |
| 1 | UDP | * | 192.*.*.* | | SEND TO CONTROLLER | 102 |
| ... | | | | | | |
| * | * | * | IP_B | | SEND TO PORT 4 | 101 |
| 5 | * | * | IP_B | | DROP | 100 |
| 5 | TCP | * | IP_B | | SEND TO PORT 6 | 101 |
| 5 | TCP | 22 | IP_B | | DROP | 102 |
| 5 | UDP | * | 192.*.*.* | | SEND TO CONTROLLER | 102 |

FIG. 17

| PHYSICAL IN PORT | PROTOCOL | PROTOCOL PORT | DESTINATION IP ADDRESS | ... | ACTION | PRIORITY |
|---|---|---|---|---|---|---|
| 1 | UDP | 40 | IP_B | | SEND TO PORT 2 | MAX |
| 3 | * | * | ... | | ... | MAX |
| | | | IP_B | | SEND TO PORT 4 | |
| 5 | UDP | 40 | IP_B | | SEND TO PORT 6 | MAX |

E1$_F$' — row 1
C1$_F$' — row 2
E2$_F$' — row 3

FIG. 18

SYSTEMS AND METHODS FOR GENERATING PACKET FORWARDING RULES BASED ON NETWORK POLICY

BACKGROUND

This relates to communication networks, and more particularly, to controlling the flow of network traffic through a communications network.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Each network switch on which a controller client has been implemented may include a flow table with entries that specify how packets are to be forwarded by that switch. A controller server may route traffic through the network by modifying the flow tables of the network switches to create packet forwarding paths for the traffic. For example, the controller server may communicate with each network switch that is associated with a desired path to route a data packet from a packet source to a packet destination. The controller server may be required to satisfy network policies that control the flow of traffic through the network. If care is not taken, packet forwarding paths created by the controller server may violate network policies.

It would therefore be desirable to be able to provide improved arrangements for controlling traffic in a communications network by configuring and controlling the network switches in the communications network.

SUMMARY

A network of switches may be required to satisfy network policies that control the flow of traffic through the network. A network policy may be defined using a set of matching criteria and associated actions to be taken when the matching criteria are satisfied. The set of matching criteria associated with a policy serves as a matching rule that determines which packets are to be processed in accordance with the policy. A network packet contains a packet header. Fields in the packet header, such as source address, network address, protocol, and protocol port and other information associated with a given packet are packet attributes that may be compared to the matching criteria. When the fields in a packet header or other packet attributes satisfy the matching rule specified by a set of matching criteria associated with a policy, the action that is associated with that policy may be taken.

An administrator may specify policies to be implemented on a network. For example, an administrator may use a user interface associated with a controller to specify matching rules and associated actions to be taken in the network. The user interface may allow the administrator to enter matching criteria, to copy and edit existing policies, to select default policies, and to assign priorities to policies.

The network of switches may be controlled by a controller server. The controller server may maintain information on all policies for the network, but it is not generally desirable to burden each switch in the network with all of the network policies. Rather, applicable policies may be provided. The controller server may, for example, determine that one or more policies may be used in handling current network traffic and may provide switches in the network with those particular policies. The policies may be provided to network switches in the form of packet forwarding rules. The packet forwarding rules may be represented by entries in a table.

To ensure that the network switches process packets accurately, priorities may be assigned to each policy to resolve conflicts. There may be dependencies between policies depending on how they overlap and their relative priorities. For example, a low priority policy may depend on a high priority policy when the matching rules for the low and high priority policies overlap. A controller server may analyze network policies to identify policy dependencies and may use the dependencies to determine which policies to provide to network switches.

The controller may provide policies to network switches when network traffic that is controlled by the policies is presented to the switches. By supplying the switches with policies, the switches may be configured to handle future traffic without the need to ask the controller server for assistance. To ensure accurate processing, the highest priority policy that governs the traffic should be provided to the network switches. The traffic may then be processed in accordance with the highest priority policy.

Sometimes higher priority policies have been implemented and are available on a controller server. Even if these higher priority policies do not apply to a current set of traffic and are not currently needed, future traffic may arrive at a network switch that requires the use of these higher priority policies. To ensure that the future traffic is processed accurately, the controller server may make sure that these higher priority policies are also provided to the network switches.

Switches may not always be able to implement administrator-defined policies. For example, a switch may not be able to apply detailed matching criteria to a particular header field. The controller server may generate a modified policy that takes the place of the desired administrator-defined policy. The modified policy may contain a broadened matching rule that makes it possible to implement the modified policy on the switches.

Controller-modified policies may be useful in situations in which it is desired to provide a switch with a high-priority administrator-defined policy to ensure accurate packet processing. Although inclusion of the high-priority administrator-defined policy may be necessary to avoid taking incorrect actions, it may not be possible to implement the desired high-priority administrator-defined policy on the switches. A controller-modified policy may therefore be provided to the switches instead of the high-priority administrator-defined policy. When the matching rule of the controller-modified policy is satisfied by a packet, the packet may be forwarded to the controller server for processing using the high-priority administrator-defined policy.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 11 is an illustrative table of flow table entries that may be used in forwarding packets along the path of FIG. 10 in accordance with an embodiment of the present invention.

FIG. 12 is a table of illustrative network policies that may be applied to a network in accordance with an embodiment of the present invention.

FIG. 16 is a table of illustrative virtualflowmods that may be formed from associated network policies in accordance with an embodiment of the present invention.

FIG. 17 is a table of illustrative flow table entries that may be generated from corresponding network policies and provided to switches in a network in accordance with an embodiment of the present invention.

FIG. 18 is a table of illustrative flow table entries that may be generated based on corresponding network policies and switch capabilities and may be provided to switches in a network in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
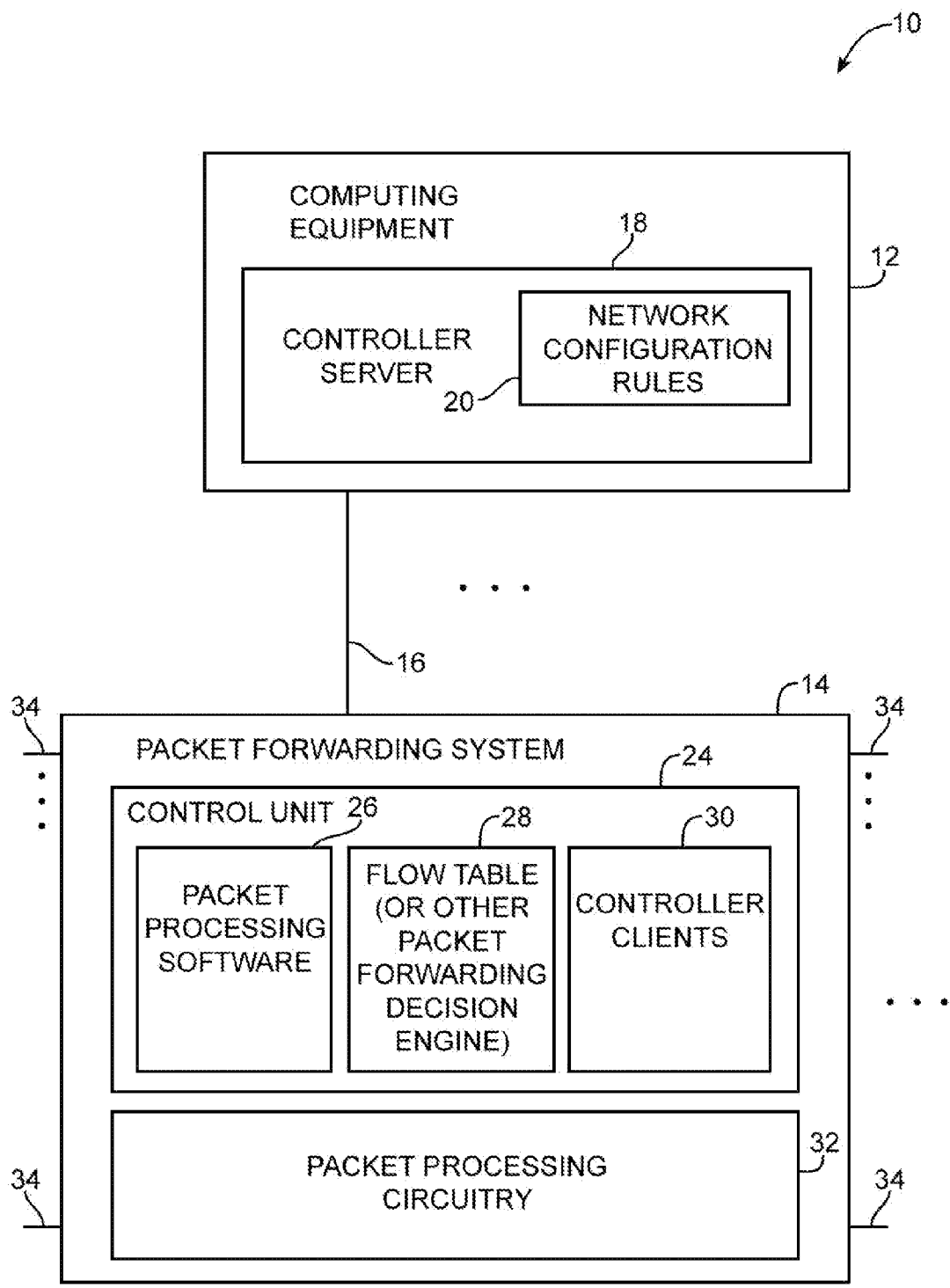
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. Any packet forwarding decision engine may be used to assist packet forwarding system 14 to make decisions about how to forward network packets. For example, packet forwarding decision engines 28 may direct packet forwarding system 14 to forward network packets to predetermined ports based on attributes of the network packets (e.g., based on network protocol headers).

Figure 2:
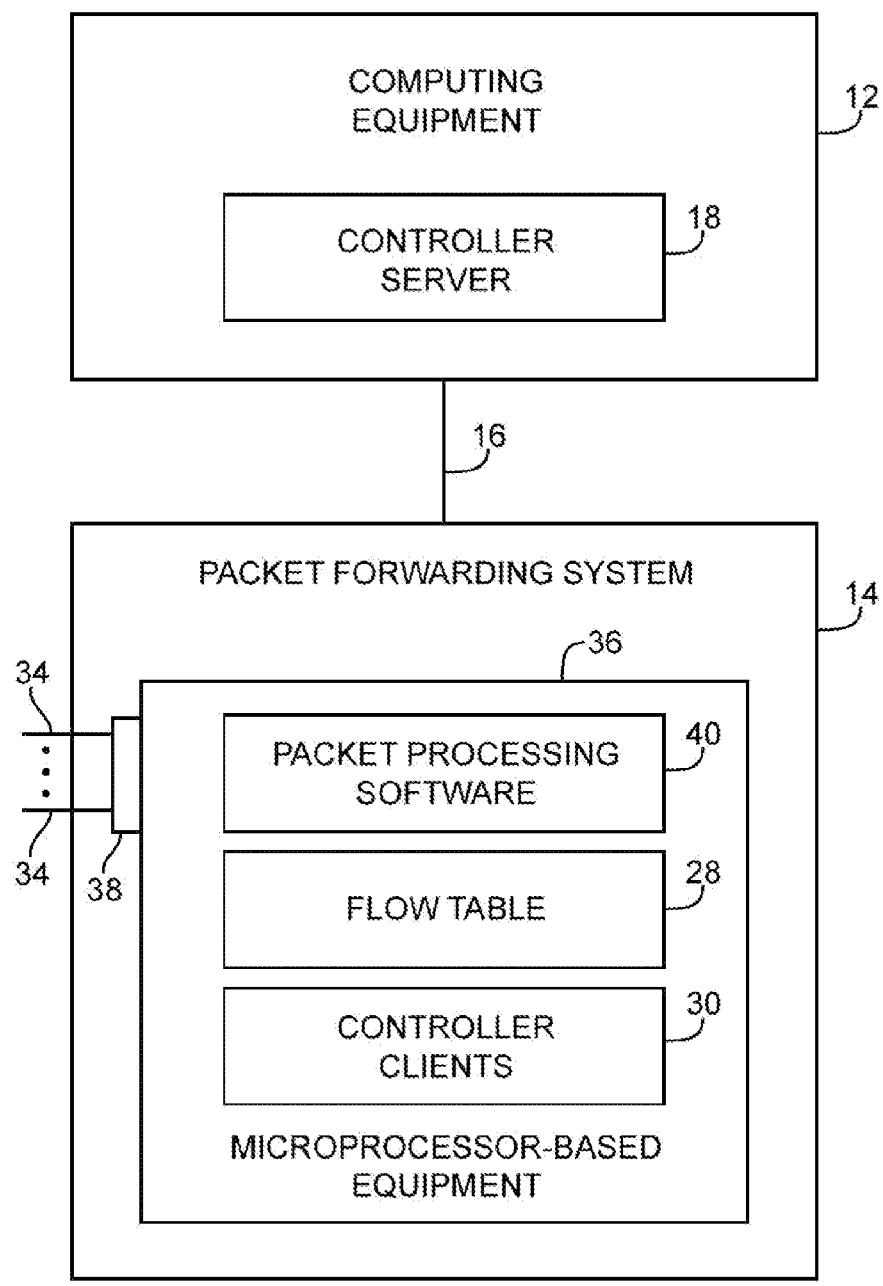
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
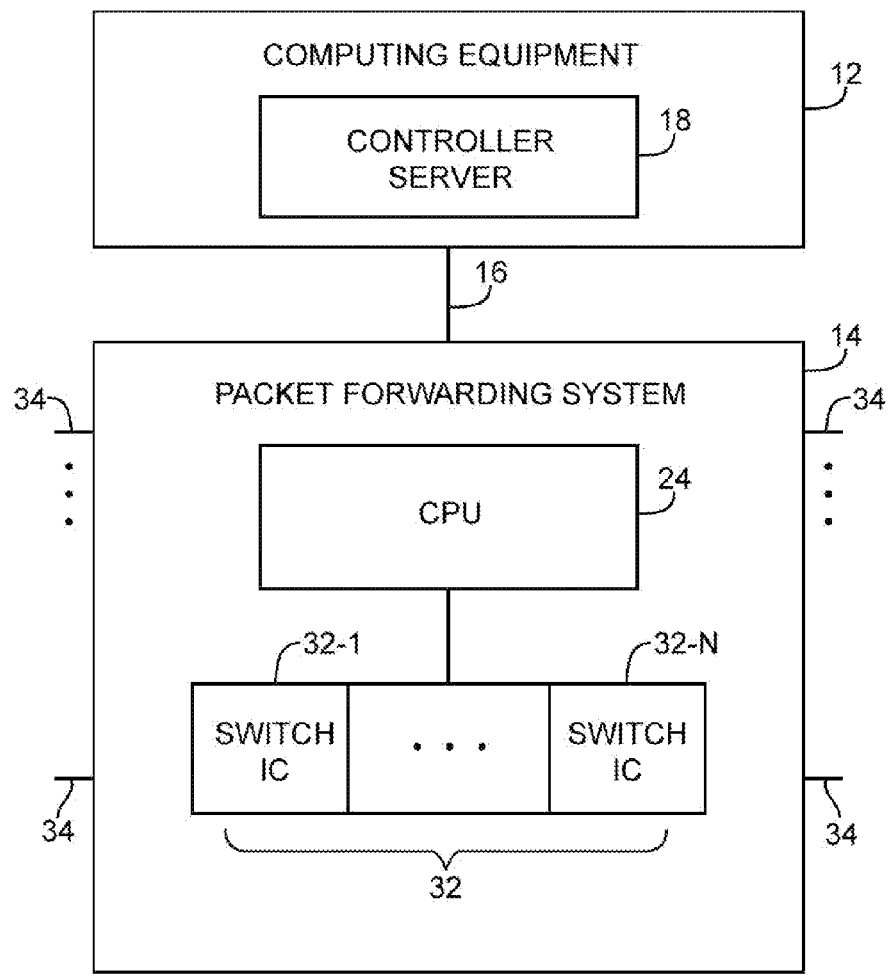
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
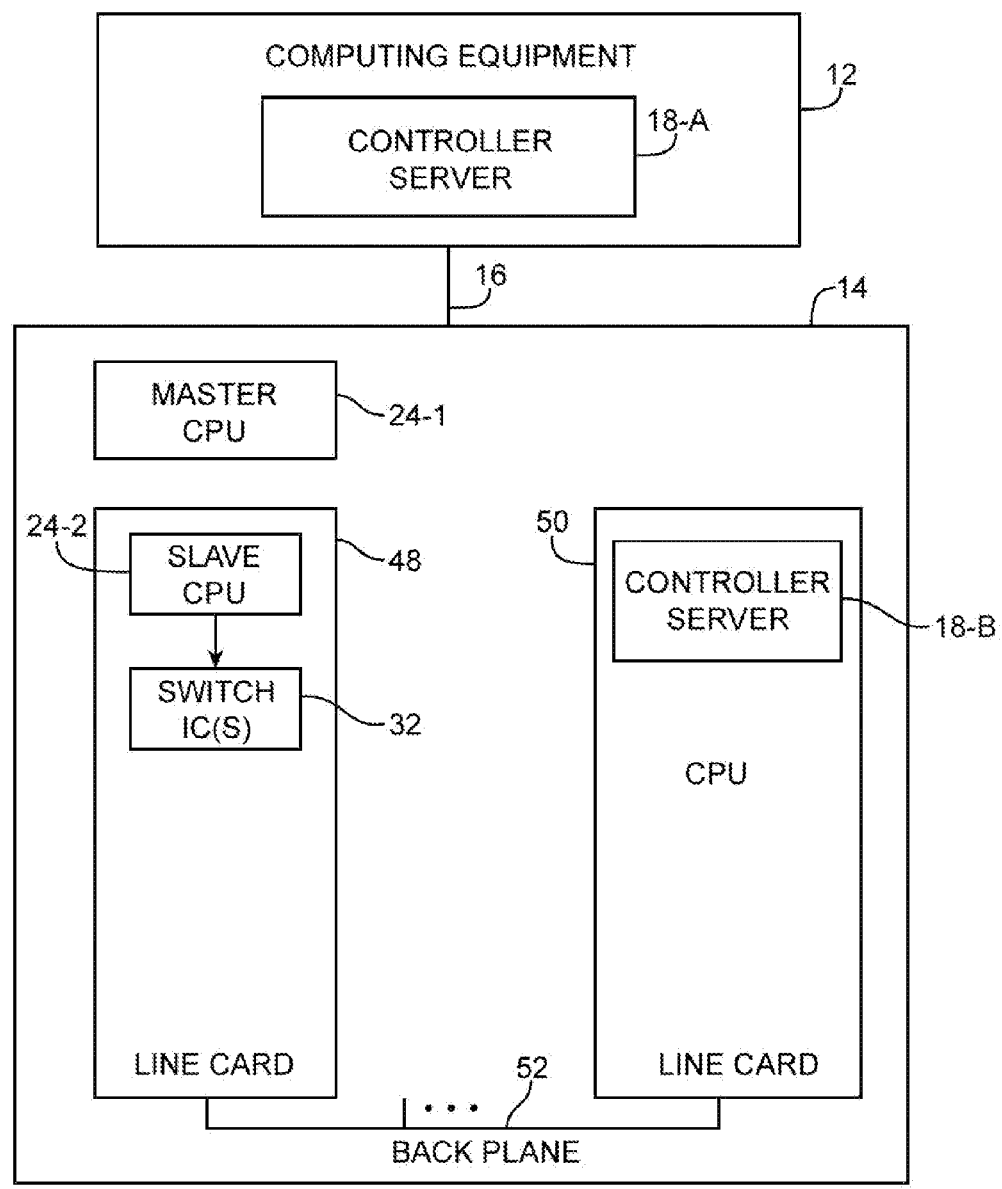
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
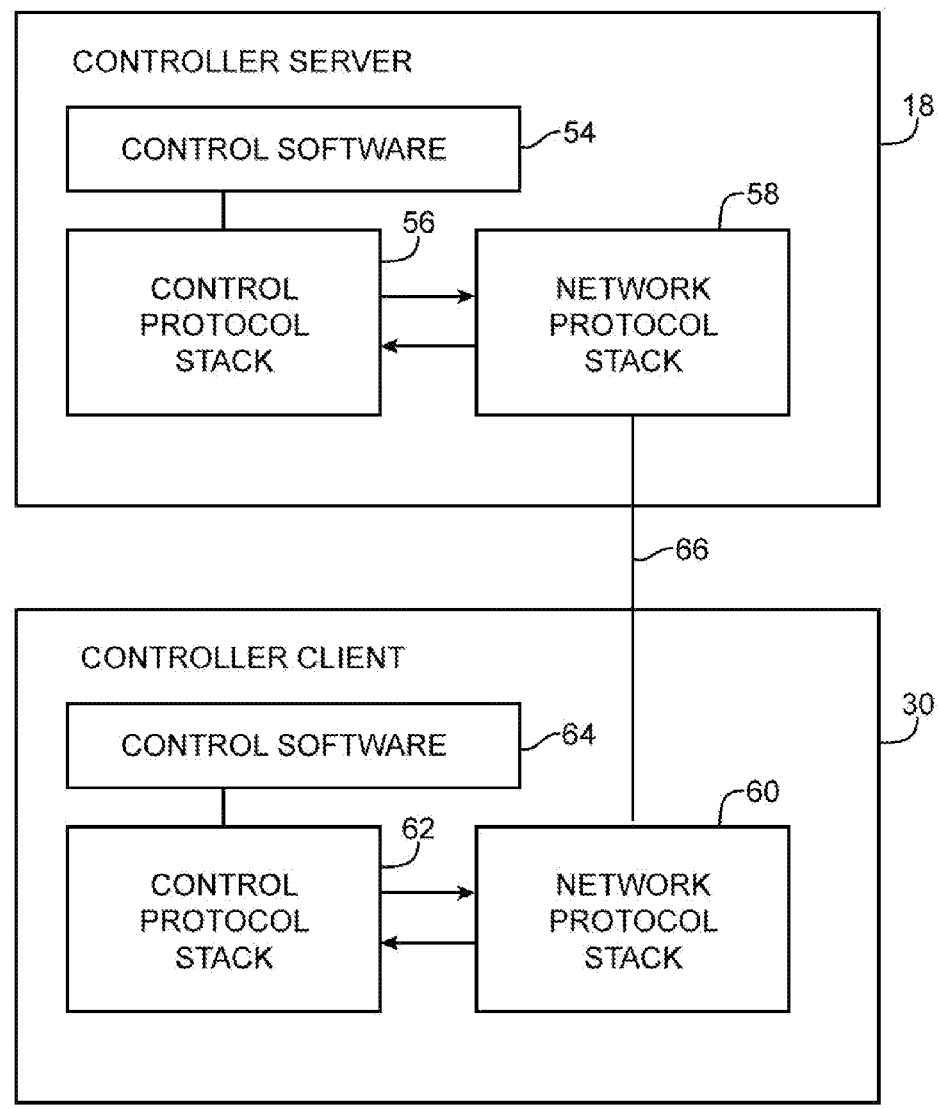
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
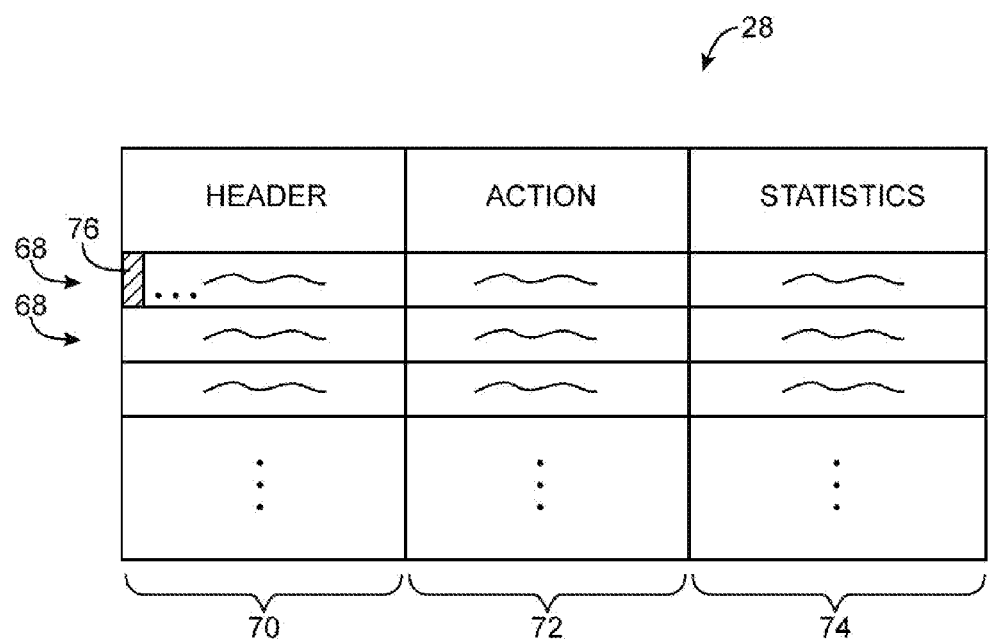
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
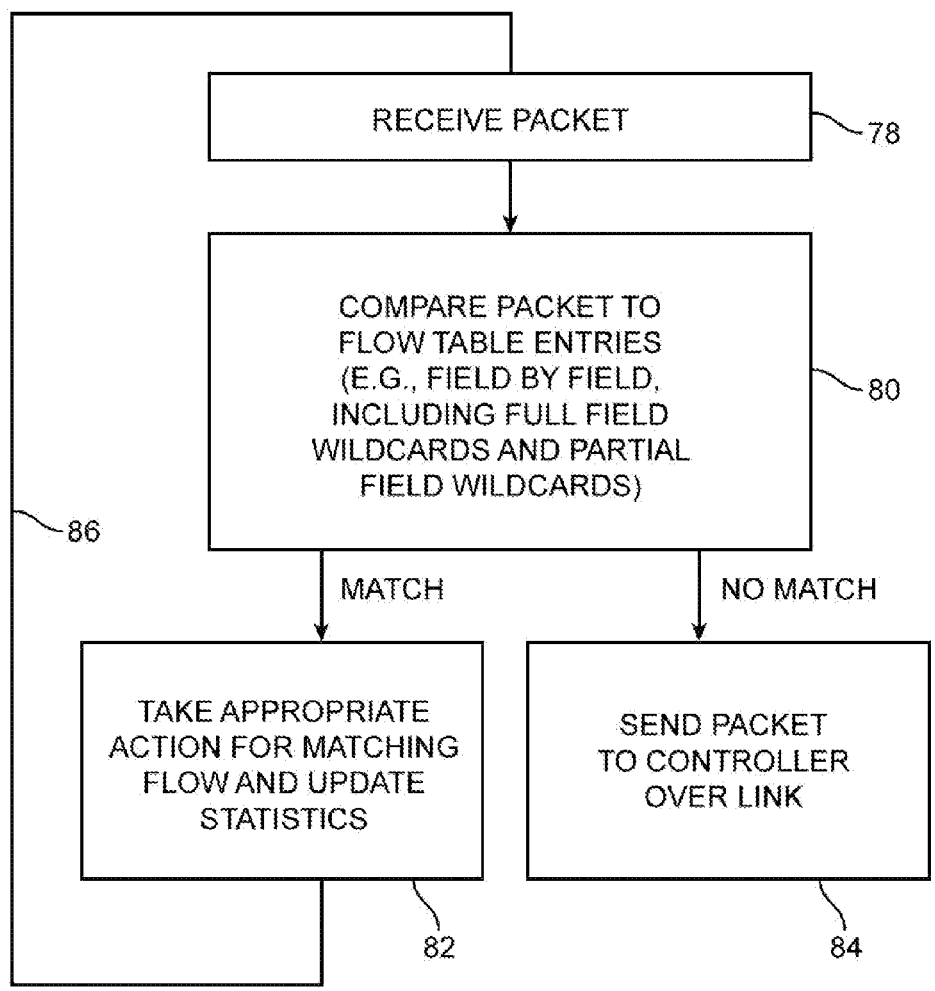
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Care should be taken so as not to overload the resources of switches 14. Each switch 14 generally has a limited flow table capacity. The capacity of a switch may, for example, limit that switch to handling no more than 10,000 flow table entries. To avoid exceeding this limit, switches at different network locations may be provided with flow table entries that implement rules with different levels of specificity.

Figure 8:
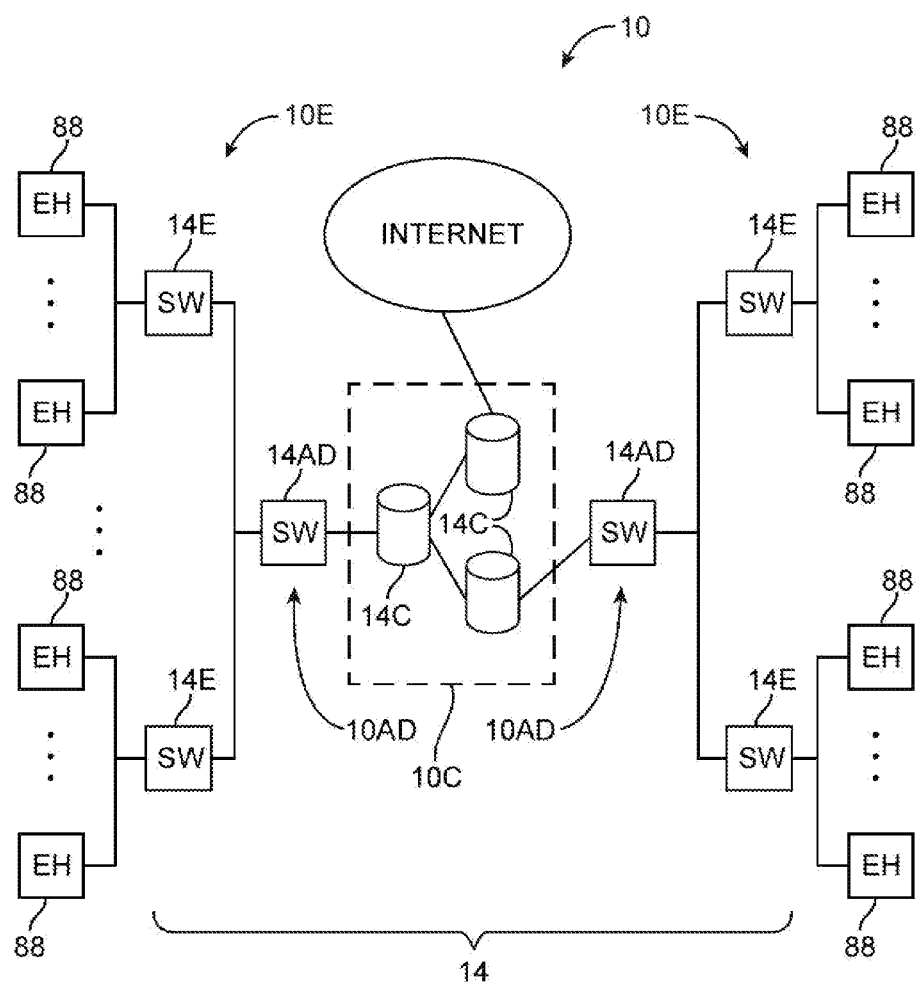
FIG. 8 is a diagram of an illustrative network showing how switches may be distributed through different portions of the network in accordance with an embodiment of the present invention.

Consider, as an example, network 10 of FIG. 8. In network 10 of FIG. 8, end hosts 88 communicate through edge switches 14E in edge portion 10E of network 10, aggregation switches 14AD in aggregation-distribution portion 10AD of network 10, and core switches 14C (one or more of which is coupled to the internet) in core portion 10C of network 10. There may be an active user associated with each of end hosts 88. Typical edge switches 14E may be connected to about 50 different end hosts 88 (as an example). Typical aggregation switches 14AD may be connected to about 20 edge switches 14E (as an example). As a result of this architecture, aggregation switches 10AD may need to handle traffic from about 1000 end hosts 88.

Active users can use web browsers and other applications that result in numerous network connections, so it is possible for aggregation switches 14AD to be required to handle 10,000 to 20,000 network connections or more. If the hardware of aggregation switches 14AD can only handle a maximum of 10,000 flow table entries, there is a potential for network 10 to become overloaded, so that some desired network connections will not be available for users.

To ensure that this potential problem is avoided, controller server 18 may provide switches in different portions of network 10 with flow table entries of different specificity. For example, edge switches 14E may be provided with more restrictive entries than aggregation switches 14AD, and/or aggregation switches 14AD may be provided with more restrictive entries than core switches 14C. This type of arrangement will allow a desired level of packet processing to be maintained overall, while easing the burden on switches such as aggregation switches 14AD and 14C whose capacity might otherwise be overwhelmed. The set of packet matching criteria of any given flow table entry may be referred to as a matching rule, because the matching criteria may indicate packet attributes that are required to match that flow table entry.

Figure 9:
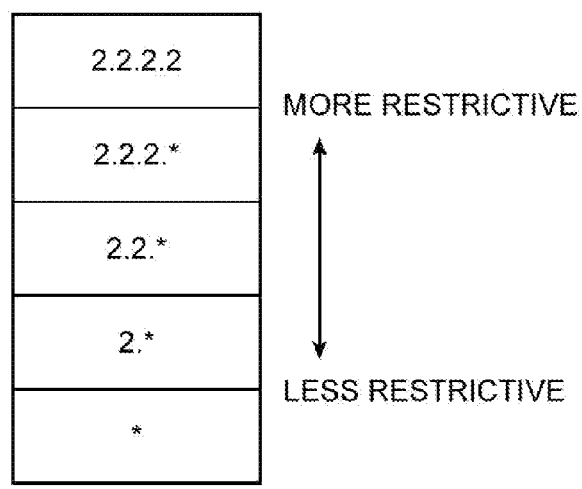
FIG. 9 is a table of illustrative flow table entries having various amounts of wildcarding in accordance with an embodiment of the present invention.

FIG. 9 shows how the matching rule associated with an illustrative header field (i.e., an IP destination address field) may be made less restrictive by incorporating more wildcarding. In the FIG. 9 example, the most restrictive value that may be used for the IP destination address field is the complete IP address "2.2.2.2". When a flow table entry has this value, the only packets that match this field will be those that contain an identical IP destination address (i.e., 2.2.2.2). A slightly less restrictive IP destination address field that may be used in the flow table entry is "2.2.2.*". By using a wildcard in the last IP address position, the requirements for matching the IP destination address field in an incoming packet are loosened, because addresses such as 2.2.2.1, 2.2.2.2, 2.2.2.3, etc. will all match the 2.2.2.* entry. The incorporation of more wildcarding will result in even less restrictive matching rules. For example, the "2.2.*" entry in FIG. 11 will match IP destination addresses of 2.2.0.0, 2.2.0.1 . . . , 2.2.1.0, 2.2.1.1, . . . . If the flow table entry field has a value of 2.*, all IP destination addresses that start with "2." will match, regardless of their values of the last three positions in the address. If the entire field is wildcarded (i.e., if the IP destination address field of FIG. 11 has a value of "*") all incoming packets will contain an IP destination address field that is considered to match the flow table IP destination address field (i.e., "*" is considered to match every address value).

As the FIG. 9 example demonstrates, flow table values that are more heavily wildcarded correspond to less restrictive matching rules, whereas flow table values that are less heavily wildcarded correspond to more specific matching criteria. When implementing a particular functionality for packet processing in a given network, it may be desirable for at least some of the switches 14 in the network to use detailed flow table entries and correspondingly restrictive matching rules. For example, switches at or near the edge of the network may be able to handle detailed flow table entries. Nearer the core of the network, however, such detailed flow table entries will tend to overwhelm the switches because of the concentration in traffic described in connection with FIG. 8. It may therefore be beneficial to use less restrictive rules for the switches that are nearer the network core. As an example, an IP destination address field of "2.2.2.2" might be used for flow tables in edge switches 14E, whereas an IP destination address field of * might be used for flow table entries in core switches 14C. Because an entry of "*" in the core switches can be applied to numerous possible destination IP addresses, the use of the less restrictive "*" value will help minimize the number of different flow table entries that are required in core switches 14C.

Figure 10:
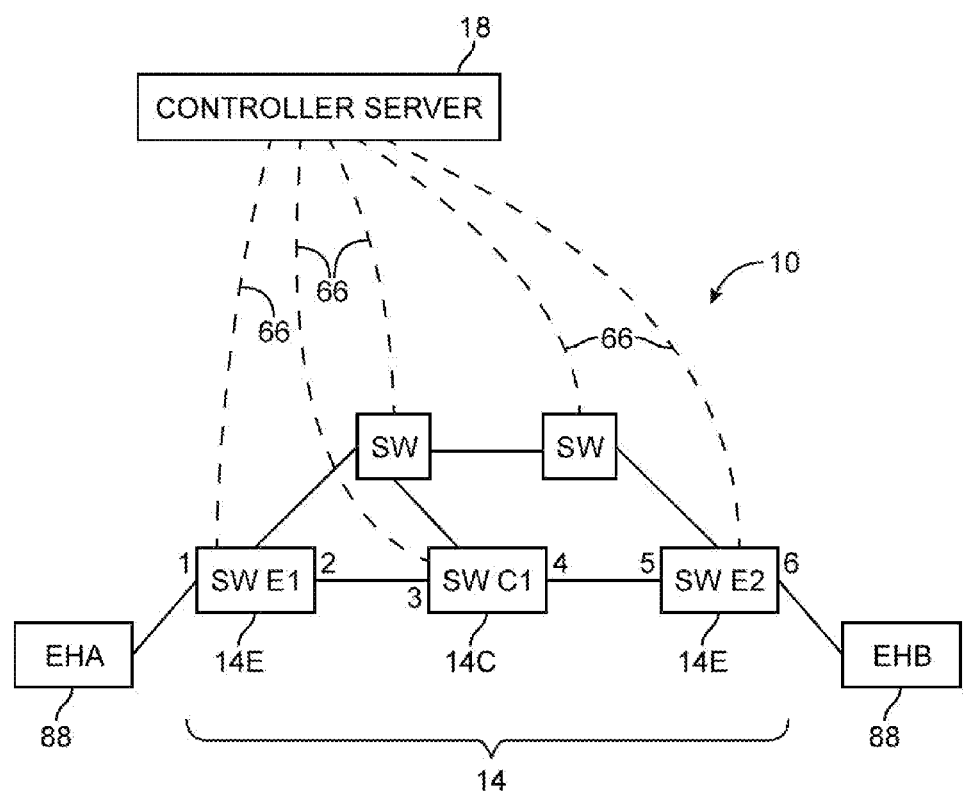
FIG. 10 is a diagram of an illustrative network showing how data may be conveyed along a forwarding path between a source packet end host and a destination packet end host in accordance with an embodiment of the present invention.

Consider, as an example, the illustrative network of FIG. 10. In the FIG. 10 example, there are two end hosts 88. End host EHA may serve as a packet source and end host EHB may serve as a packet destination. Switches 14 include edge switches 14E and core switches such as switch 14C. During setup operations or during real time network configuration operations, controller server 18 may provide switches SW E1, SW C1, and SW E2 with flow table entries suitable for forwarding packets from end host EHA to end host EHB over the network path through switch SW E1, switch SW C1, and switch SW E2 (e.g., the flow table entries may be provided to the switches via network paths 66). The physical input-output ports that are associated with the switches of FIG. 10 are shown adjacent to the links connecting the switches. For example, the label "1" adjacent to switch SW E1 indicates that end host EHA is connected to port 1 of switch E1. The label "2" adjacent to switch SW E1 and the label "3" adjacent to switch SW C1 indicates that port 2 of switch E1 is connected to port 3 of switch SW C1, etc.

A scheme that may be used to maintain a desired level of network performance (e.g., to maintain security) while reducing the burden that is placed on the switches of the network (e.g., the aggregation and core switches) from flow table entries is illustrated by the flow table entries of FIG. 11. Flow table entries E1', C1', and E2' may be provided to switches at different portions of the network. For example, entries E1' and E2' may be used for switches SW E1 and SW E2 of FIG. 10, respectively, and entry C1' may be used for switch 14C. Flow table entries E1', C1' and E2' may have differing levels of restrictiveness. In particular, the matching rules for switches nearer the core of the network (e.g., entry C1' for core switch SW C1 in FIG. 10) may have more wildcarding and may be less restrictive than the matching rules for switches farther from the core of the network (e.g., entries E1' and E2' for edge switches 14E).

For example, flow table entries such as entry E1', which may be used to instruct switch SW E1 how to forward incoming packets, may contain specific information within the physical port input field and the IP source address field, whereas flow table entries such as entry C1', which may be used to direct an aggregation switch or core switch SW C1 how to forward incoming packets, may contain at least some wildcarding. With the example of FIG. 11, both entry E1' (used by switch SW E1) and entry E2' (used by switch SW E2) contain only complete fields and contain no fields with wildcarding, whereas entry C1' contains multiple fields that are fully wildcarded (i.e., physical input port, IP source address, destination TCP port, and source TCP port).

Because entries such as the C1' entry contain more wildcarding than entries such as the E1' and E2' entries, the use of entries such as the C1' entry helps reduce the number of flow table entries that are maintained by core switch SW C1 (in this example). This reduces the flow table burden on switch SW C1 and helps prevent switches 14 from becoming overwhelmed.

Controller server 18 can distribute flow table entries for a table of the type shown in FIG. 11 selectively. For example, controller server 18 can distribute flow table entries such as flow table entry E1' to edge switches such as switch E1 but not to switches nearer the network core such as switch SW C1 and can distribute flow table entries such as flow table entry C1' to core switches or switches near the core such as switch SW C1 but not to edge switches.

A network administrator may use controller server 18 to implement network policies that control the flow of network packets through network 10. The table of FIG. 12 shows illustrative network policies X, Y, Z, W, and V that may be implemented using controller server 18 to control network traffic through network 10 of FIG. 10. Network policy X may block end host EHA from transmitting network packets to end host EHB. Network policy Y may allow end host EHA to transmit to end host EHB using the Transmission Control Protocol (TCP). Network policy Z may block end host EHA from transmitting to end host EHB using TCP on TCP port 22.

Network policies may include regular expressions that define which network packets are controlled by the network policies. Network policy W may allow end host EHA to transmit to IP addresses that match the expression "192.*.[2,3,4].*". The above expression may match network packets that have a first subfield of "192," a second subfield of "*" (e.g., any of the possible subfield values), a third subfield of "[2,3,4]" (e.g., a third subfield equal to 2, 3, or 4), and a fourth subfield of "*." Examples of network packets that may be controlled by network policy W are network packets transmitted from end host EHA that are transmitted to IP addresses such as 192.1.2.1, 192.1.3.1, 192.1.4.1, 192.255.4.10, etc. Network policy V may block end host EHA from transmitting network packets using the User Datagram Protocol (UDP) on UDP port 80 to IP addresses matching the expression 192.*.*.*.

Each network policy may be assigned a corresponding priority value (priority) that determines which network policy controls each given network packet. Network policies X, Y, Z, W, and V may be assigned respective priority values 100, 101, 102, 103, and 104. Network policies that have higher priorities may take precedence over network policies with lower priorities. For example, network policy X with priority 100 may block end host EHA from transmitting to end host EHB, but network policy Y with priority 101 may allow end host EHA to transmit to end host EHB using the TCP protocol. In this scenario, a network packet transmitted from end host EHA to end host EHB using the TCP protocol may match both network policies. The network packet may be allowed to reach end host EHB because network policy Y has a higher priority value than network policy X.

The network policies shown in FIG. 12 are merely illustrative. If desired, the network policies may include selectively modifying or replacing network packets, implementing access control lists (e.g., by selectively blocking network packets), selectively duplicating network packets, selectively redirecting network packets, logging network packets (e.g., by selectively storing information relating to the network packets), generating alerts, or other actions performed to control the flow of network traffic.

Figure 13:
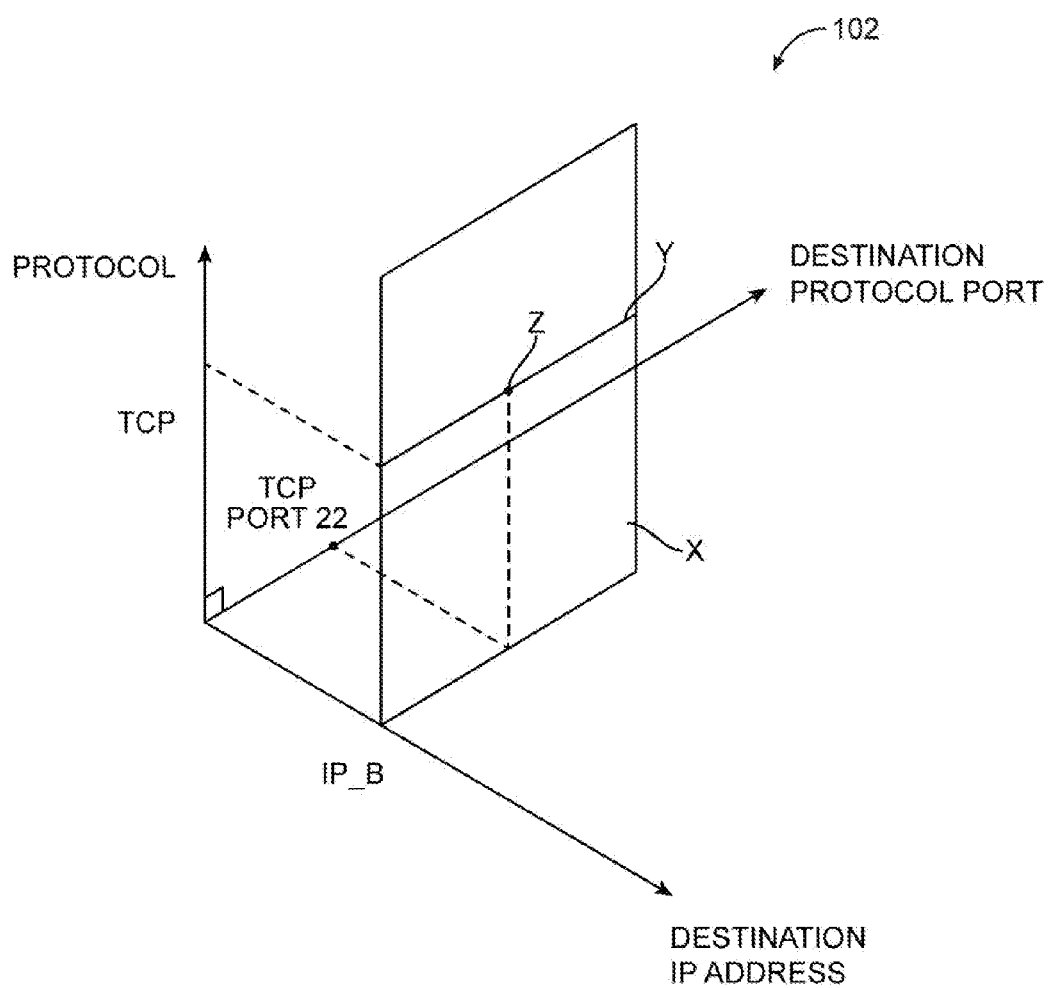
FIG. 13 is a diagram representing illustrative network policies in a corresponding flowspace in accordance with an embodiment of the present invention.

Network policies may control network traffic based on any combination of network packet attributes. For example, a network policy may control packets based on any desired combination of fields in a flow table entry (e.g., the columns of FIG. 6B). Each network policy may be visually represented as an object in n-dimensional space (sometimes referred to as a flowspace), where n is the number of packet attributes that may be used by that network policy to identify network packets. A diagram showing an illustrative visual representation of network policies X, Y, and Z is shown in FIG. 13. In the example of FIG. 13, network policies are represented in a 3-dimensional space 102 that has a first dimension corresponding to possible network protocols, a second dimension corresponding to possible destination IP addresses, and a third dimension corresponding to possible destination protocol ports.

Network policy X (e.g., a network policy that blocks end host EHA from transmitting to end host EHB) may be represented as a plane in space 102 that includes a destination IP address of IP_B (e.g., the IP address of end host EHB), all possible protocols, and all possible protocol ports. Network policy Y (e.g., a network policy that allows end host EHA to transmit to end host EHB using TCP) may be represented as a line that includes the TCP protocol, a destination IP address of IP_B, and all possible destination protocol ports. Network policy Z (e.g., a network policy that blocks end host EHA from transmitting to end host EHB using the TCP protocol on TCP port 22) may be represented as a point in flow space 102 that corresponds to destination IP address IP_B, the TCP protocol, and destination protocol port 22.

Network policies X, Y, and Z may overlap in flow space 102. Network policy Y may be a subset of network policy X (e.g., the line corresponding to Y may be a subset of the plane corresponding to X) and network policy Z may be a subset of network policy Y and a subset of network policy Z (e.g., the point corresponding to Z may be on the line corresponding to Y and on the plane corresponding to X).

Figure 14:
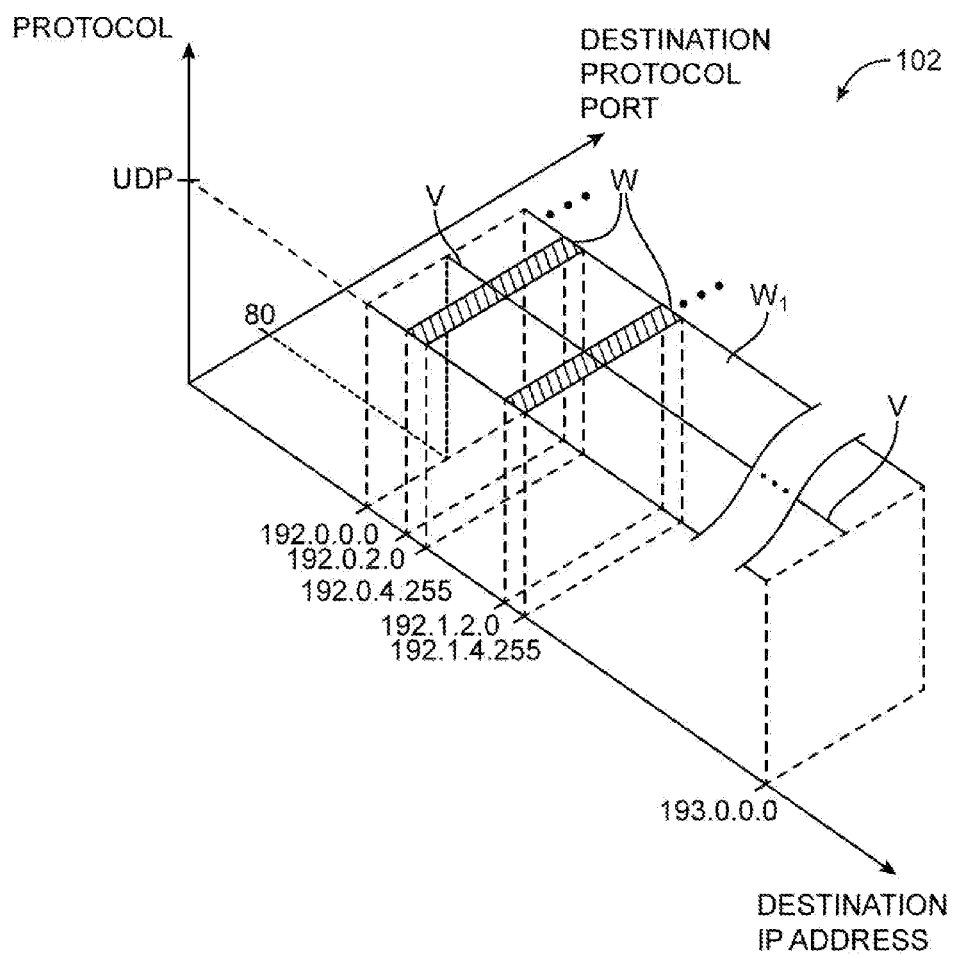
FIG. 14 is a diagram showing how illustrative network policies may overlap in a corresponding flowspace in accordance with an embodiment of the present invention.

Network policies may match combinations of network traffic attributes that cannot be accommodated by a network switch. For example, network switches may only support wildcarding for full IP address sub-fields (e.g., 192.*.*.* or 192.*.1.2). In this scenario, network switches may be unable to accommodate network policy W that controls network packets with IP addresses that match the regular expression 192.*.[2,3,4].* (e.g., because the network switches may be unable to differentiate between packets with a third IP address subfield that matches the set [2,3,4] and packets with a third IP address subfield that do not match the set [2,3,4]). FIG. 14 shows a visual representation of network policies W and V illustrating how network switches may be unable to accommodate network policy W.

The example of a network policy W using a regular expression to define which network packets are controlled by network policy W is merely illustrative. If desired, any subset of possible network packets may be controlled by a given network policy and a subset controlled by that given network policy may match combinations of network traffic attributes that cannot be accommodated by network switches.

As shown in FIG. 14, network policy W may be represented as a series of rectangular planes in flow space 102. For example, network policy W may include a first rectangular plane corresponding to the UDP protocol, all possible destination protocol ports, and destination IP addresses from 192.0.2.0 and 192.0.4.255. As another example, network policy W may include a second rectangular plane corresponding to the UDP protocol, all possible destination protocol ports, and destination IP addresses from 192.1.2.0 and 192.1.4.255. In other words, network policy W may include a series of rectangular planes that each correspond to the UDP protocol, all possible destination protocol ports, and destination IP addresses of 192.*.2.*, 192.*.3.*, or 192.*.4.*.

Controller server 18 may be unable to configure network switches to exactly accommodate network policy W (e.g., because network switches may lack sufficient wildcarding precision to accommodate the regular expression 192.*.[2,3,4].*). For example, network switches may only be able to provide full wildcarding for the third IP address subfield (e.g., the network switches may be able to identify network packets with IP addresses of 192.*.*.*., but not IP addresses of 192.*.[2,3,4].*). Plane W1 may represent the closest available approximation to network policy W in flow space 102 (e.g., plane W1 may represent a network policy matching IP addresses of 192.*.*.*). In other words, plane W1 may reflect a network policy that can be implemented by network switches and also includes all network packets that are controlled by network policy W.

The example of using a single plane (e.g., a network policy corresponding to a plane in flowspace) representing network policy W is merely illustrative. If desired, network policy W may be represented as a set of network policies that collectively cover the space associated with network policy W. Each network policy of the set of network policies may control network packets with attributes that can be identified using network switches.

Network policies may overlap in flow space 102. Network policy V may be represented by a line in flow space 102 that corresponds to the UDP protocol, destination IP addresses between 192.0.0.0 and 193.0.0.0, and destination UDP port 80. Network policy V may overlap with network policy W (e.g., the line of network policy V may intersect each rectangular plane of network policy W).

Plane W1 may be a minimum object in flow space that includes both network policies W and V (e.g., plane W1 may include line V and the series of rectangular planes of W). For example, plane W1 may be the minimum network policy that includes both network policies W and V that controller server 18 may be able to implement by configuring network switches. A minimum object in a flow space that controller server 18 may be able to implement may sometimes be referred to as a circumscribed network policy or an approximate network policy. The example of FIGS. 13 and 14 in which network policies are represented in three dimensions is merely illustrative. If desired, network policies may control network packets with any combination of packet attributes (e.g., fields in a flow table entry, regular expressions, etc.). For example, a network policy may match packets based on attributes such as physical input ports, IP source addresses, destination TCP ports, source TCP ports, IP destination addresses, network protocols, network protocol ports, etc. The network policy may be represented in a flow space with a number of dimensions equal to the number of different attributes (e.g., fields in a matching rule) used by the network policy to identify network packets to be controlled.

Figure 15:
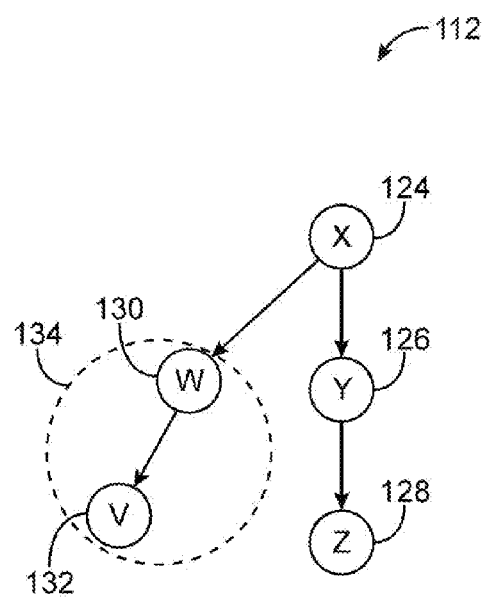
FIG. 15 is an illustrative directed acyclic graph that represents dependencies between network policies in accordance with an embodiment of the present invention.

Network policies that are applied to network 10 may affect network traffic that corresponds to other network policies. In other words, network policies that overlap in a representative flowspace may control traffic that potentially corresponds to both network policies. To implement a given network policy, controller server 18 may be required to consider dependencies between the given network policy and other network policies. FIG. 15 shows a directed acyclic graph (DAG) 112 that may be constructed by controller server 18 to represent dependencies between the network policies of FIG. 12. Directed acyclic graph 112 may include nodes that each correspond to a network policy. For example, root node 124 may correspond to network policy X and node 130 may correspond to network policy W.

Directed links between nodes may be formed based on whether or not the network policies of the nodes overlap (e.g., in corresponding flowspace 102) and based on priorities of the corresponding network policies. Pairs of nodes that have overlapping network policies may be coupled by a directed link from the lower priority rule to the higher priority rule. For example, controller server 18 may identify that network policy Y overlaps with network policy X in flowspace 102 (e.g., that network policy X matches some of the same packets as network policy Y). Controller server may identify that network policy Y has a higher priority than network policy X and construct a directed link from node 124 to node 126. Each directed link between a source node and a target node may indicate that the source node is dependent on the target node (e.g., the link between node 124 to 126 may indicate that network policy X is dependent on network policy Y).

To implement a first network policy that is dependent on a second network policy, controller server 18 may also be required to implement the second network policy. For example, to implement network policy X that blocks all traffic sent from end host EHA to end host EHB, controller server 18 may be required to implement network policy Y that allows network traffic sent from end host EHA to end host EHB using the TCP protocol (e.g., because network policy Y has a higher priority than network policy X). Therefore to implement the first network policy, controller server 18 may be required to implement the second network policy, as well as any network policies that the second network policy depends on.

Forwarding of a network packet through network 10 may have performance penalties associated with the time required to configure the switches (e.g., packet forwarding latency associated with the time required for controller server 18 to send control packets to the switches). To improve network performance, it may be desirable for controller server 18 to maximize the number of network packets with different attributes that can be controlled by any set of packet forwarding rules (e.g., flow table entries).

To implement packet forwarding rules for a packet transmitted from end host EHA to end host EHB using TCP port 80, controller server 18 may be required to implement network policies Y and Z (e.g., because network policy Y controls the packet and network policy Y depends on network policy Z). However, it may be desirable for controller server 18 to also implement network policy X, because network policy X is a relatively broad network policy (e.g., network policy X covers a relatively large region in flowspace 102). By implementing network policy X simultaneously with network policies Y and Z, controller server 18 may improve the performance of network 10, because the switches may be simultaneously configured with packet forwarding rules for the current network packet and other packets that may be transmitted from end host EHA to end host EHB.

However, by implementing network policy X, controller server 18 may also be required to implement other network policies that X depends on. For example, because network policy X depends on network policy W, controller server 18 may be required to implement network policies W and V. Network policies W and V may not be associated with the network packet that is being transmitted (e.g., network policies W and V may control network packets sent using the UDP protocol, while the network packet was sent using the TCP protocol). In other words, network policies W and V may not overlap with network policy Y in a corresponding flowspace.

To implement each network policy, controller server 18 may be required to implement packet forwarding rules such as flow table entries. To more efficiently utilize flow table storage capacities when determining packet forwarding rules for a given packet, controller server 18 may selectively merge network policies that are not associated with that packet (e.g., network policies of nodes formed on different branches of directed acyclic graph 112). For example, a packet that is controlled by network policy Y may be unrelated to network policies W and V. Therefore network policies W and V may be merged to form a circumscribed policy (e.g., a network policy that controls all packets that are associated with network policies W and V). For example, nodes 130 and 132 in directed acyclic graph 112 may be merged to form node 134. As an example, node 134 may be associated with a merged network policy that identifies network packets transmitted from end host EHA to IP addresses that match 192.*.*.* using the UDP protocol and on any UDP port. In this example, node 134 may direct switches to forward the identified network packets to controller server 18. Merging nodes in directed acyclic graph 112 may sometimes be referred to as pruning directed acyclic graph 112, because nodes that are not related to the given network packet may be replaced by merged nodes.

If desired, controller server 18 may selectively merge network policies that are associated with a received packet. Consider a scenario in which the packet is associated with many network policies. In this scenario, controller server 18 may reduce the number of flow entries required to generate a packet forwarding path for the packet by merging some or all of the network policies that are associated with the received packet to form one or more merged network policies. The merged network policies may be implemented along with the highest-priority network policy that matches the packet (e.g., to ensure that the packet is forwarded correctly).

To implement network policies for a given network packet, controller server 18 may translate each network policy into a corresponding matching rule, exact match flag, action, and priority. The matching rule may identify a circumscribed network policy for that network policy (e.g., a circumscribed network policy that can be implemented on network switches). The exact match flag may identify whether or not the matching rule perfectly describes that network policy (e.g., whether or not the flow space for the matching rule is the same as the flow space for that network policy). The action may specify actions to perform on network packets that match the corresponding matching rule (e.g., deny, allow, or send to controller server). The translated network policies (e.g., sets of matching rules, exact match flags, actions, and priorities) may sometimes be referred to herein as virtualflowmods or controller-modified network policies.

The example described above in which an exact match flag is used to indicate whether or not a matching rule perfectly describes the network policy is merely illustrative. If desired, the exact match flag may be replaced with a "not tight" or "not exact match" flag that indicates whether or not a matching rule does not perfectly describe a corresponding network policy (e.g., the inverse of the exact match flag).

The translated network policies (virtualflowmods) may be organized into a table such as table 122 shown in FIG. 16. Each entry of table 122 may include a virtualflowmod (e.g., a controller-modified network policy) generated from a corresponding network policy (e.g., from a network policy specified by a network administrator). Table 122 may include virtualflowmods Xv, Yv, Zv, Wv, and Vv generated from corresponding network policies X, Y, Z, W, and V of FIG. 12.

Virtualflowmod Xv may include a matching rule that matches packets having a source Ethernet address of A (e.g., the source Ethernet address of end host EHA) and destination IP address IP_B. Virtualflowmod Xv may include an exact match flag that indicates that the matching rule perfectly matches network policy X (e.g., that the matching rule covers the same space as network policy X in a corresponding flowspace 102). Virtualflowmod Xv may include an action field that denies (blocks) network packets that match the matching rule and may include a priority of 100 to correspond with network policy X. Virtualflowmod Yv, Zv, and Vv may be constructed in a similar fashion to correspond with respective network policies Y, Z, and V.

Virtualflowmod Wv may include a matching rule that matches packets having a source Ethernet address of A, the UDP network protocol, a protocol port (e.g., UDP protocol port) of 80, and destination IP addresses of 192.*.*.*. The matching rule of virtualflowmod Wv may imperfectly match corresponding network policy W (e.g., because controller server 18 may be unable to configure network switches to implement a matching rule that matches packets having destination IP addresses of 192.*.[2,3,4].*). Therefore the exact match flag of virtualflowmod Wv may be set to "no," to identify that virtualflowmod Wv does not exactly match corresponding network policy W. Because the matching rule does not exactly match corresponding network policy W, the action field of virtualflowmod Wv may be set to "controller," to identify that network packets that match the matching rule should be sent to controller server 18 for processing (e.g., because the network switches may be unable to precisely identify packets that correspond to network policy W).

The virtualflowmods may be generated based on a directed acyclic graph such as directed acyclic graph 112 of FIG. 15. Consider the scenario in which controller server 18 receives a packet from end host EHA that was sent from end host EHA to end host EHB using the TCP protocol. In this scenario, controller server 18 may use directed acyclic graph 112 to identify network policies that are associated with the received packet and network policies that are unrelated. Controller server 18 may identify that nodes 124, 126, and 128 are associated with the received packet (e.g., because corresponding network policies X, Y, and Z match attributes of the received packet). Controller server 18 may identify that nodes 130 and 132 are not related to the received packet (e.g., because corresponding network policies 130 and 132 do not control packets that are transmitted using the TCP protocol). Controller server 18 may merge nodes 130 and 132 to form circumscribed node 134 and replace corresponding virtualflowmods Wv and Vv in table 122 with virtualflowmod Wc.

The matching rule of virtualflowmod Wc may match packets having a source Ethernet address of A, the UDP network protocol, any protocol port, and destination IP addresses of 192.*.*.*. Virtualflowmod Wc may describe a network policy that is a minimal superset of network policies Wv and Vv (e.g., a circumscribed network policy). In other words, the matching rule of virtualflowmod Wc may match all network packets that would be controlled by virtualflowmods Wv and Vv while minimizing matches to network packets that are not controlled by virtualflowmods Wv and Vv.

The exact match flag of virtualflowmod Wc may be set to "no" (e.g., because virtualflowmod Wc does not exactly match any one network policy). The action field of virtualflowmod Wc may be set to "controller," to indicate that network packets that match virtualflowmod Wc should be sent to controller server 18 for processing. The priority field of virtualflowmod Wc may be set to a priority value that is between the lowest priority of the virtualflowmods that virtualflowmod Wc has replaced and the highest priority of virtualflowmods that depend on Wc (e.g., so that network policies W and V may be implemented in the future with correct priority values). For example, virtualflowmod Wc that replaces virtualflowmods Wv and Vv may be assigned a priority of 102. In this scenario, virtualflowmods Wv and Vv may be implemented with corresponding priority values 103 and 104 without being overridden by virtualflowmod Wc (e.g., because Wc has a priority value less than the priority values of virtualflowmods Wv and Vv).

The example of assigning a priority value of 102 to virtualflowmod Wc is merely illustrative. If desired, the priority field of virtualflowmod Wc may be set to a priority value that is between the highest priority of network policies that depend on the network policies replaced by virtualflowmod Wc and the lowest priority of network policies that the merged policy of Wc depends on. For example, virtualflowmod Wc may be assigned a priority value greater than 100 (e.g., because network policy X that depends from the merged policy of Wc has a priority value of 100 and the merged policy of Wc does not depend from any other network policies).

Controller server 18 may use the virtualflowmods of table 122 to determine packet forwarding rules (e.g., flow table entries) for network packets. FIG. 17 shows an illustrative set of flow table entries that may be generated based on table 122 for a network packet sent from end host EHA to end host EHB using the TCP protocol on TCP port 25. The flow table entries in FIG. 17 may be provided to switches in network 10 of FIG. 10 to generate a network switch forwarding path (e.g., a packet forwarding path through switches 14) from end host EHA to end host EHB while ensuring that the network policies of FIG. 12 are satisfied.

Controller server 18 may identify a network switch forwarding path from end host EHA to end host EHB through switches SW E1, SW C1, and SW E2. Controller server 18 may generate a first set of flow table entries E1F for switch SW E1, a second set of flow table entries C1F for switch SW C1, and a third set of flow table entries E2F for switch SW E2.

Flow table entries E1F and E2F may be generated based on corresponding virtualflowmods of FIG. 16. Virtualflowmod Xv may be converted into a flow table entry of priority 100 that directs switch SW E1 to drop packets that are received at physical input port 1 and destined for IP address IP_B.

Virtualflowmod Yv may be converted into a flow table entry of priority 101 that identifies network packets that are received at physical input port 1, use network protocol TCP, and are destined for IP address IP_B. The flow table entry may direct switch SW E1 to forward the identified network packets to port 2 (e.g., to the next switch along the network switch forwarding path).

Virtualflowmod Zv may be converted into a flow table entry of priority 102 that identifies network packets that are received at physical input port 1, use network protocol TCP on TCP port 22, and are destined for IP address IP_B. The flow table entry may direct switch SW E1 to drop network packets that match the flow table entry.

Virtualflowmod Wc (e.g., a virtualflowmod formed from merging network policies that are not related to the network packet sent from end host EHA to end host EHB) may be converted into a flow table entry of priority 102 that identifies network packets that are received at physical input port 1, use network protocol UDP, and are destined for IP addresses 192.*.*.*. The flow table entry may direct switch SW E1 to forward the identified network packets to controller server 18 (e.g., so that controller server 18 can determine packet forwarding rules for the identified network packets).

Edge switch SW E2 may be provided with flow table entries E2F that are also converted from the virtualflowmods of FIG. 16. Flow table entries E2F may be adapted for switch SW E2. For example, physical input port 5 may be assigned to the physical input port field of entries E2F and allowed packets may be sent by entries E2F to port 6.

The flow table entries of FIG. 17 may improve network performance by maximizing how many different network packets (e.g., network packets with different attributes) are controlled by the flow table entries while ensuring that network policies are satisfied. For example, by maximizing the use of wildcards, flow table entries E1F and E2F may provide network switches with forwarding instructions for packets with attributes that are different from the original packet (e.g., the packet sent from end host EHA to end host EHB using the TCP protocol on TCP port 80). For example, a packet sent from end host EHA to end host EHB using the TCP protocol on TCP port 80 may be correctly forwarded through the network.

To conserve flow table capacities of switches in network 10, controller server 18 may implement network policies at edge switches while implementing more general packet forwarding rules at core switches. Edge switches SW E1 and SW E2 may be provided with packet forwarding rules that implement associated network policies while core switches such as SW C1 may be provided with a minimal set of packet forwarding rules (e.g., to conserve the limited flow table capacity of core switches). In the example of FIG. 17, core switch C1F may be provided with a single flow table entry that forwards to port 4 all packets that are sent to end host EHB (e.g., all packets that have a destination IP address of IP_B).

Controller server 18 may convert virtualflowmods to packet forwarding rules based on exact match flags. For a given network packet, controller server 18 may generate packet forwarding rules based on whether or not that network packet matches a virtualflowmod that has an asserted exact match flag (e.g., a flag indicating that the virtualflowmod is an exact match of a corresponding network policy). For example, controller server 18 may generate the flow table entries of FIG. 17 in response to receiving a network packet sent from end host EHA that is destined for end host EHB and that uses the TCP network protocol on TCP port 80 (e.g., because the received network packet matches virtualflowmod Yv that has an asserted exact match flag).

In response to receiving a network packet that has an exact match flag set to "no" (e.g., an exact match flag that is not asserted), controller server 18 may generate packet forwarding rules that directly match the network packet. FIG. 18 shows an illustrative table 142 with flow table entries that may be generated in response to a network packet sent from end host EHA to end host EHB using the UDP protocol on UDP port 40 (e.g., a network packet that matches a virtualflowmod with an exact match flag that is not asserted).

Controller server 18 may identify that the network packet matches virtualflowmod Wc of FIG. 16 (e.g., because the network packet uses the UDP protocol and because IP_B may be included in the IP addresses specified by 192.*.*.*). Virtualflowmod Wc may have an exact match flag that identifies that virtualflowmod Wc does not exactly correspond to a single network policy. In this scenario, controller server 18 may provide switches 14 with flow table entries that are specific to the network packet. Controller server 18 may generate flow table entries E1F' for switch SW E1, C1F' for switch SW C1, and E2F' for switch SW E2. Flow table entries for edge switches SW E1 and SW E2 may implement network policy that directly matches the network packet.

In the example of FIG. 18, network policy W may be the highest priority network policy that matches the network packet. Edge switches SW E1 and SW E2 may be provided with corresponding flow table entries E1F' and E2F' that satisfy network policy W for the network packet sent from end host EHA to end host EHB. Core switches such as SW C1 may be provided with a minimal set of flow table entries that implement network policy associated with the network packet sent from end host EHA to end host EHB (e.g., core switch SW C1 may be provided with flow table entries that have more wildcarding).

The flow table entries shown in table 142 may each be assigned a maximum priority value to prevent interference with other flow table entries (e.g., flow table entries implemented for other network packets). By assigning the maximum priority value to flow table entries E1F', C1F', and E2F', controller server 18 may ensure that the network policy implemented by the flow table entries is not affected by network policies implemented for other network packets (e.g., because flow table entries with maximum priority values may take precedence over other flow table entries).

Controller server 18 may convert virtualflowmods to packet forwarding rules based on network switch capabilities. For example, flow table entries that directly match a given network packet (e.g., such as in FIG. 18) may be provided to network switches when controller server 18 identifies that the network switches are not capable of prioritizing flow table entries (e.g., when every flow table entry is assigned the maximum priority or when priorities cannot be assigned to the flow table entries).

Figure 19A:
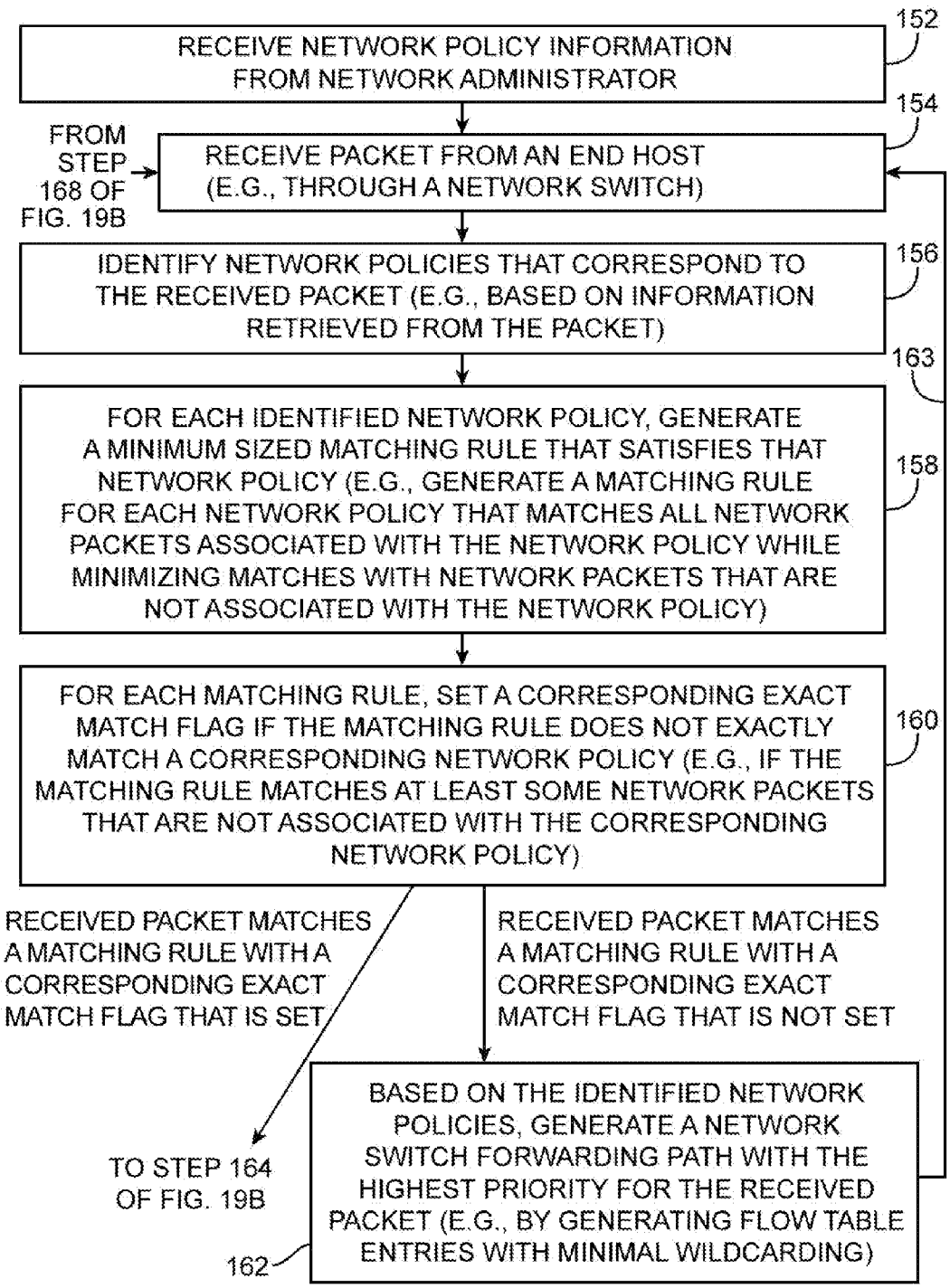
FIGS. 19A and 19B show a flow chart of illustrative steps that may be performed to generate flow table entries based on network policies, network switch capabilities, and network switch attributes in accordance with an embodiment of the present invention.
Figure 19B:
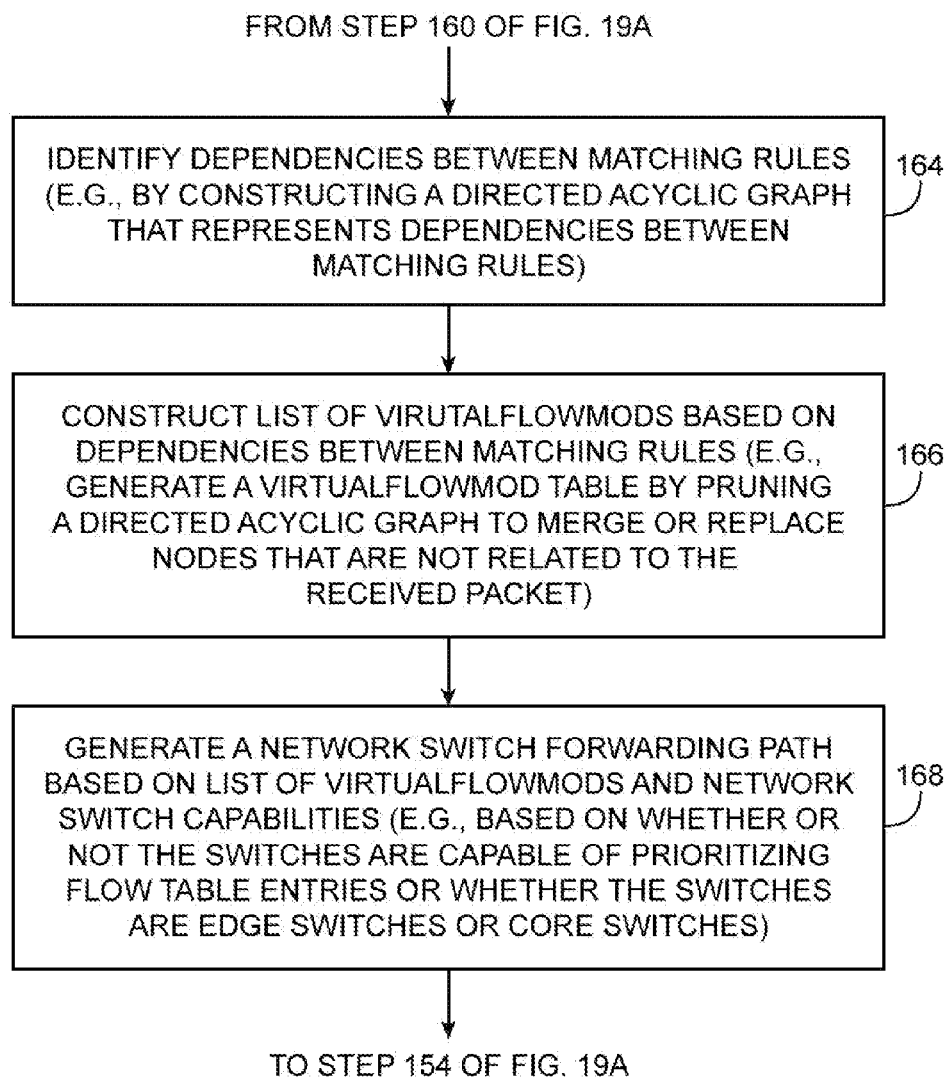

To implement network policy by generating packet forwarding rules for switches or other packet forwarding systems in a network, the steps of FIGS. 19A and 19B may be performed. The steps of FIGS. 19A and 19B may be described herein as being performed by controller server 18.

In step 152, controller server 18 may receive network policy information from a network administrator. For example, controller server 18 may receive the network policies of FIG. 12 and store the network policies in a corresponding database.

In step 154, controller server 18 may receive a network packet from an end host. The network packet may be received through a network switch coupled to the end host. For example, a network packet may be sent from the end host to a port of the network switch. The network switch may identify that no flow table entries (or other packet forwarding rules) that are associated with the network packet exist in a corresponding flow table. The network switch may then forward the network packet to controller server 18.

In step 156, controller server 18 may identify network policies that correspond to the received packet. For example, controller server 18 may use packet attributes such as source network addresses, destination network addresses, protocols, protocol ports, or other packet header fields to identify network policies that are associated with the packet attributes. Network policies that overlap with network policies associated with the received packet may also be identified (e.g., network policies that overlap in a corresponding flowspace may be identified by controller server 18).

In step 158, controller server 18 may generate a minimum sized matching rule for each network policy identified in step 156 (e.g., for each network policy that is associated with the received packet). Each minimum sized matching rule may include all network packets associated with a corresponding network policy while minimizing the inclusion of network packets that are not associated with the corresponding network policy (e.g., each matching rule may circumscribe the corresponding network policy in a corresponding flowspace such as flowspace 102).

In step 160, controller server 18 may set an exact match flag for each minimum sized matching rule based on whether or not the matching rule exactly matches a corresponding network policy (e.g., if a matching rule covers the same region in flowspace as a corresponding network policy, the exact match flag may be asserted for that matching rule). If the received packet is identified by a matching rule that exactly matches a corresponding network policy (e.g., if the exact match flag for that matching rule is asserted), the operations of step 164 of FIG. 19B may be performed. If the received packet is identified by a matching rule that does not exactly match a corresponding network policy (e.g., if the exact match flag for that matching rule is not asserted), the operations of step 162 may be performed.

If desired, the operations of step 160 may be performed concurrently with step 158 (e.g., exact match flags may be set as the corresponding flow table matching rules are generated).

In step 162, controller server 18 may generate a network switch forwarding path for the received packet based on the identified network policies that are associated with the received packet. The network switch forwarding path may be generated by providing network switches in the forwarding path with appropriate flow table entries. For example, the entries of FIG. 18 may be provided to switches 14 in network 10 to form a network switch forwarding path that forwards packets transmitted from end host EHA to end host EHB using the UDP protocol on protocol port 40. In this scenario, minimal wildcarding may be used in the flow table entries that are provided to the switches (e.g., because the network switch forwarding path is specific to the received packet). Processing may then loop back to step 154 via path 163 to generate network switch forwarding paths that satisfy network policies for packets that are received from end hosts.

In step 164 of FIG. 19B, controller server 18 may identify dependencies between matching rules. For example, controller server 18 may construct a directed acyclic graph 112 that identifies dependencies (e.g., overlaps in flowspace) between matching rules based on priorities of the network policies that correspond to the matching rules.

In step 166, controller server 18 may construct a list of virtualflowmods based on the identified dependencies between matching rules. For example, controller server may construct a table 122 that includes a list of virtualflowmods. The virtualflowmods may be formed by merging or replacing matching rules that do not match the received packet (e.g., matching rules for network policies that are not associated with the received packet).

In step 168, controller server 18 may generate a network switch forwarding path based on the list of virtualflowmods and network switch capabilities. For example, controller server 18 may generate a network switch forwarding path using flow table entries that are optimized to reduce the number of flow table entries provided to core switches (e.g., by implementing network policies at edge switches instead of core switches). As another example, controller server 18 may identify whether or not network switches are capable of prioritizing flow table entries in order to determine whether to implement a network switch forwarding path that implements a single network policy or a network switch forwarding path that implements multiple network policies via prioritization of flow table entries. Processing may then loop back to step 154 to generate network switch forwarding paths that implement network policy for packets that are received from end hosts.

The example of FIGS. 19A and 19B in which steps 152-168 are performed by a controller server are merely illustrative. If desired, steps 152-168 may be performed in a distributed fashion in many switches (e.g., by a controller that is distributed throughout many switches) or on a per-switch basis (e.g., each switch may receive network policy information and determine forwarding paths through that switch based on the network policies). For example, a controller may be partially implemented on all or some of the switches in the network. Portions of the controller may be included with some of the network switches. The controller portion of a given switch may communicate with controller portions of other switches (e.g., to share information regarding the network such as network topology, network policies, switch capabilities, switch attributes, etc.).

Figure 20:
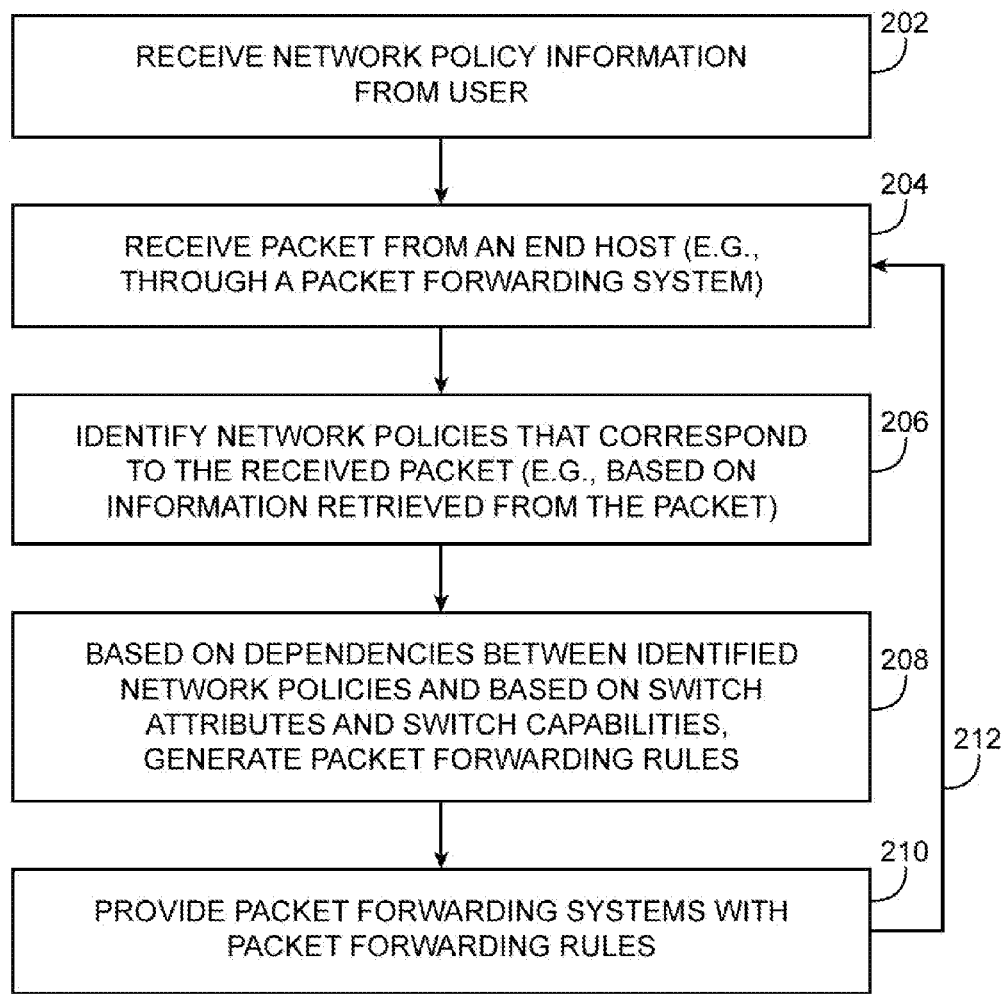
FIG. 20 show a flow chart of illustrative steps that may be performed to generate packet forwarding rules based on network policies, network switch capabilities, and network switch attributes in accordance with an embodiment of the present invention.

The flowchart of FIG. 20 shows illustrative steps that may be performed to provide packet forwarding systems in a network with packet forwarding rules based on dependencies between network policies. The steps of FIG. 20 may be performed by controller server 18, in a distributed fashion using many switches, or on a per-switch basis.

In step 202, controller server 18 may receive network policy information from a user such as a network administrator. The network policy information may include network policies that control network traffic flow.

In step 204, controller server 18 may receive a packet from an end host (e.g., through a packet forwarding system). The received packet may include information identifying a packet source (e.g., the end host from which the packet was received) and a packet destination.

In step 206, controller server 18 may identify network policies that correspond to the received packet (e.g., based on information retrieved from the packet such as packet header information).

In step 208, controller server 18 may generate packet forwarding rules based on dependencies between the identified network policies and based on switch attributes and switch capabilities. The dependencies between the identified network policies may be determined based on overlaps between corresponding matching rules or based on priorities of the network policies. The switch attributes may include whether the switch is a core switch that routes relatively many traffic flows (e.g., a switch that normally does not have any end hosts directly coupled to ports of the switch) or an edge switch that routes relatively few traffic flows. The switch capabilities may include whether or not the switches are capable of prioritizing packet forwarding rules. The generated packet forwarding rules may be optimized to efficiently utilize network resources such as flow table capacities and optimized to implement multiple network policies. For example, controller server 18 may perform steps 158-168 of FIG. 20 to generate flow table entries using a directed acyclic graph that represents dependencies between network policies. As another example, controller server 18 may generate flow table entries by initially wildcarding all fields in the flow table entries, identifying all fields that are controlled by different network policies, and removing the wildcarding for the identified fields (e.g., by replacing the wildcarding with entries that are specific to the received packet).

In step 210, controller server 18 may provide packet forwarding systems in the network with the generated packet forwarding rules to form a forwarding path from the packet source to the packet destination.

The foregoing is merely illustrative of the principles of this invention and various modifications can be made by those skilled in the art without departing from the scope and spirit of the invention.

What is claimed is:

1. A method of using a controller to control network switches in a network, wherein packets having packet attributes flow through the network, the method comprising:

with the controller, receiving network policies from a network administrator, wherein each network policy has an associated matching rule to apply to the packet attributes of a packet to determine whether or not the packet satisfies that matching rule and wherein each network policy has an associated action to be performed on the packet when the packet satisfies the matching rule;

with the controller, identifying dependencies between the network policies by identifying overlaps between the matching rules; and based on the identified dependencies, providing the network policies to the network switches.

2. The method defined in claim 1 wherein the network policies have different priorities, wherein the priorities specify which of the network policies is to be applied to a packet when the packet satisfies the matching rules for multiple network policies, the method further comprising:

with the controller, identifying a set of network policies with associated matching rules that are each satisfied by the packet;

with the controller, identifying which network policy of the set of network policies has highest priority among the set of network policies; and providing the identified highest priority network policy to the network switches.

3. The method defined in claim 2 wherein the network policy with the highest priority comprises a first network policy, the method further comprising:

with the controller, identifying a second network policy that has an associated matching rule that overlaps with the matching rule of the first network policy and is not satisfied by the packet; and providing the second network policy to the network switches.

4. The method defined in claim 3 further comprising:

with the controller, identifying a third network policy that has an associated matching rule that overlaps with the matching rule of the first network policy, that is satisfied by the packet, and that has a lower priority than the first network policy; and providing the third network policy to the network switches.

5. The method defined in claim 4, wherein the network switches have packet matching capabilities, the method further comprising:

with the controller, identifying at least one network policy that has an associated matching rule that overlaps with the matching rule of the third network policy;

based on the packet matching capabilities of the network switches, determining that the network policy cannot be implemented by the network switches;

in response to determining that the network policy cannot be implemented by the network switches, generating a controller-modified policy with an associated matching rule, wherein the matching rule associated with the network policy is a subset of the matching rule associated with the controller-modified policy; and providing the controller-modified policy to the network switches instead of the network policy.

6. The method defined in claim 1, wherein the network switches have packet matching capabilities, the method further comprising:

based on the packet matching capabilities of the network switches, determining whether or not the network policies have associated matching rules that cannot be implemented using the network switches; and in response to determining that a given one of the network policies has an associated matching rule that cannot be implemented by the network switches, generating a controller-modified policy with an associated matching rule, wherein the matching rule associated with the network policy is a subset of the matching rule associated with the controller-modified policy; and with the controller, providing the controller-modified policy to the network switches instead of the given one of the network policies.

7. The method defined in claim 1 wherein the network policies have respective priorities, wherein the priorities specify which of the network policies is to be applied to a packet when the packet satisfies the matching rules for multiple network policies, and wherein identifying the dependencies between the network policies comprises comparing the priorities of the network policies.

8. The method defined in claim 1 wherein identifying dependencies between the network policies comprises forming a directed acyclic graph based on the network policies.

9. The method defined in claim 1 wherein each of the network switches has a corresponding flow table that controls network traffic through that network switch and wherein providing the network policies to the network switches comprises providing flow table entries that control a flow of network packets through the network switches in the network.

10. The method defined in claim 1 wherein providing the network policies to the network switches comprises generating packet forwarding rules with the controller that control a flow of network packets through the network switches in the network.

11. The method defined in claim 10 further comprising:

with the controller, identifying whether the network switches are capable of prioritizing the packet forwarding rules; and in response to identifying that the network switches are capable of prioritizing the packet forwarding rules, providing the packet forwarding rules for at least two of the network policies to the network switches from the controller.

12. The method defined in claim 11 further comprising:

in response to identifying that the network switches are incapable of prioritizing the packet forwarding rules, providing the packet forwarding rules for a given one of the network policies to the network switches from the controller.

13. The method defined in claim 10 further comprising:

with the controller, categorizing some of the switches in the network as edge switches and some of the switches in the network as non-edge switches, wherein generating the packet forwarding rules comprises generating different packet forwarding rules for the switches that have been categorized as edge switches than the switches that have been categorized as non-edge switches.

14. A method of using a controller to control network switches in a network, wherein packets having packet attributes flow through the network and are subject to network policies, wherein each network policy specifies an action to perform on the packets when the packet attributes of the packets satisfy matching criteria associated with that network policy, the method comprising:

with the controller, identifying dependencies between the network policies by identifying overlaps between the matching criteria;

based on the identified dependencies, identifying which of the network policies to provide to the network switches; and providing the identified network policies from the controller to the network switches.

15. The method defined in claim 14 wherein the network policies have different priorities, wherein the priorities specify which of the network policies is to be applied on a packet when the packet satisfies the matching criteria for multiple network policies, and wherein providing the identified network policies comprises providing at least one of the network switches with network policies having different priorities.

16. The method defined in claim 14 wherein providing the identified network policies to the network switches comprises generating packet forwarding rules with the controller that control a flow of network packets through the network switches in the network, further comprising:
   with the controller, categorizing some of the switches in the network as edge switches and some of the switches in the network as non-edge switches, wherein generating the packet forwarding rules comprises generating different packet forwarding rules for the switches that have been categorized as edge switches than the switches that have been categorized as non-edge switches.

17. The method defined in claim 14 wherein identifying which of the network policies to provide to the network switches comprises identifying a given one of the network policies whose matching rule is satisfied by the network packets.

18. The method defined in claim 17 wherein identifying which of the network policies to provide to the network switches comprises identifying at least one additional network policy having a matching rule that is not satisfied by the packets, wherein the matching rule of the additional network policy overlaps with the matching rule of the given one of the network policies.

\* \* \* \* \*